US007559153B2

(12) United States Patent
Allen

(10) Patent No.: US 7,559,153 B2
(45) Date of Patent: Jul. 14, 2009

(54) APPARATUS AND METHODS FOR THE PLACEMENT OF BADGES, RIBBONS AND/OR OTHER ITEMS

(76) Inventor: Matthew Bridger Allen, 1220 Lake Plaza Dr., Suite A, Colorado Springs, CO (US) 80906

( * ) Notice: Subject to any disclaimer, the term of this patent is extended or adjusted under 35 U.S.C. 154(b) by 1 day.

(21) Appl. No.: 11/726,583

(22) Filed: Mar. 22, 2007

(65) Prior Publication Data

US 2007/0266500 A1 Nov. 22, 2007

Related U.S. Application Data

(60) Provisional application No. 60/786,420, filed on Mar. 27, 2006.

(51) Int. Cl.
*G01D 21/00* (2006.01)
*A44C 3/00* (2006.01)

(52) U.S. Cl. ............................ 33/653; 33/563; 33/645; 40/1.5

(58) Field of Classification Search .................. 33/653, 33/562, 563, 566, 11, 12, 13, 2 R, 1 G, 679.1, 33/485, 662, 644, 645, 613; 40/1.5, 1.6; 112/136
See application file for complete search history.

(56) References Cited

U.S. PATENT DOCUMENTS

| | | | | |
|---|---|---|---|---|
| 2,387,986 | A * | 10/1945 | Evans | 33/653 |
| 2,681,511 | A * | 6/1954 | Seton | 33/653 |
| 2,795,876 | A | 6/1957 | Hayes | |
| 2,821,787 | A * | 2/1958 | Shepard | 33/653 |
| 2,847,773 | A * | 8/1958 | Herrick | 40/1.5 |
| 2,853,791 | A | 9/1958 | Wood | |
| 3,092,915 | A * | 6/1963 | Bell | 33/653 |
| 3,129,515 | A * | 4/1964 | Best | 33/653 |
| 3,376,651 | A * | 4/1968 | Carey | 33/653 |
| 3,500,550 | A * | 3/1970 | Mihai | 33/662 |
| 3,798,781 | A * | 3/1974 | Wolfe | 33/563 |
| 4,302,884 | A * | 12/1981 | Pallone | 33/653 |
| 5,063,684 | A * | 11/1991 | Winters | 33/653 |
| 5,782,022 | A * | 7/1998 | Tubberville | 40/1.6 |
| 6,311,408 | B1 * | 11/2001 | Madayag | 33/653 |
| 7,096,614 | B1 * | 8/2006 | Williams | 40/1.5 |
| 7,325,339 | B2 * | 2/2008 | Jordan | 40/1.5 |
| 2006/0137229 | A1 | 6/2006 | Jordan | |
| 2007/0266500 | A1 * | 11/2007 | Allen | 7/164 |
| 2007/0294924 | A1 * | 12/2007 | Schriver | 40/1.5 |
| 2008/0222816 | A1 * | 9/2008 | Allen | 7/164 |

* cited by examiner

*Primary Examiner*—Amy Cohen Johnson
(74) *Attorney, Agent, or Firm*—Alberto Q. Amatong, Jr.; The Amatong Law Firm PLL

(57) ABSTRACT

In some embodiments, a template is useful for properly positioning at least one item having at least first and second rear-facing engagers at a desired location on the front of a carrier and is removable thereafter without disturbing the position of the at least one item.

17 Claims, 2 Drawing Sheets

APPARATUS AND METHODS FOR THE PLACEMENT OF BADGES, RIBBONS AND/OR OTHER ITEMS

This application claims priority to U.S. Provisional Application Ser. No. 60/786,420 filed Mar. 27, 2006 and entitled Apparatus & Methods for the Placement of Badges, Ribbons and/or Other Items, the entire contents of which are hereby incorporated by reference herein in their entirety.

FIELD OF THE DISCLOSURE

The present disclosure relates generally to methods and apparatus for locating or placing items on carriers. In some embodiments, for example, the items are military badges and/or ribbons and the carriers are service uniforms.

BACKGROUND

It is often desirable to specifically locate or position one or more item on a carrier thereof. Some examples of "carriers" are uniform garments, simulated and artificial garments, flags, display boards and objects that are ornamental or useful, or a combination thereof. Some examples of "items" are badges, ribbons, medals, awards and/or pins. For example, organizations, such as uniformed and public safety services, typically require that insignia be positioned at specific locations on uniforms worn by its members.

For one particular example, the current regulations of the United States Marine Corps (USMC) for proper positioning of insignia worn on USMC uniforms can be found in the Department of the Navy, MARINE CORPS ORDER P1020.34G MCUB, dated Mar. 31, 2003, particularly, without limitation, Chapter 5, which is incorporated by reference herein in its entirety, and more particularly Pages 5-22, 5-23, 5-35 and 5-40. Presently, all U.S. Marines are required to qualify with the rifle and must wear the appropriate rifle marksmanship badge (expert, sharpshooter or marksman) on designated garments. Under current regulations, each rifle marksmanship badge includes a holding bar having back-facing spikes used to secure the badge to the carrier, such as above the left breast pocket of a uniform blouse or shirt. A series of small metal ringlets connect the holding bar to the main section of the badge. The size of the holding bars and spike location are the same for all three present versions of the rifle marksmanship badges.

A U.S. Marine may also qualify with the pistol. In such instance, present USMC regulations require the Marine to wear both a rifle and a pistol marksmanship badge on particular uniforms. However, when a member has not qualified on the pistol, the only badge that will be worn is the rifle marksmanship badge. In such case, current USMC regulations require the rifle marksmanship badge to be centered over the left breast pocket of the carrier with the bottom edge of the holding bar ⅛$^{th}$ inch above the top edge of the pocket.

Similar to the rifle marksmanship badge, there are presently three levels of pistol qualification: expert, sharpshooter and marksman. Current embodiments of these badges have similar components as the rifle marksmanship badges described above, including a holding bar having back-facing spikes and a series of small metal ringlets connecting the holding bar to the main section of the badge. The holding bars on all three types of pistol marksmanship badges are identical in terms of size and spike placement.

Under present USMC regulations, the pistol marksmanship badges, including holding bars, are smaller than those of the rifle marksmanship badges. When wearing both a rifle and a pistol marksmanship badge, present USMC regulations require the badges be symmetrically placed on a line, centered over the breast pocket, with a ¾ inch space between the adjacent holding bars. The bottom edge of the rifle holding bar must be ⅛$^{th}$ inch above the top edge of the left breast pocket. As the pistol badge holding bar is smaller than the holding bar of the rifle badge, present regulations require the top edge of the pistol holding bar to be in-line with the top edge of the rifle holding bar.

When wearing one or more marksmanship badges, present USMC regulations require that any earned service ribbons are also worn. The service ribbons must be centered over the left breast pocket with the bottom edge of the lowest ribbon(s) positioned ⅛$^{th}$ inch over the top edge of the marksmanship badge(s) holding bar.

However, the present disclosure is not limited to placement of USMC or other military badges and ribbons on service uniforms. Moreover, the present disclosure is not limited by the type, construction or components of garment or other carrier with which the disclosure may be used, or the badge(s), ribbon assembly(ies), medals or other items that may be placed on the carrier. For example, the present disclosure may be used with the placement of other types of badges or ribbons of any military service or other organization on any uniform garment or any other form of carrier (flag, display board, ornament, useful object, simulated garment, etc.), as well as the placement of any other type of items that need to be specifically positioned at any desired location on any carriers thereof.

In positioning and locating one or more items on a carrier, difficulties may be encountered. For example, the item(s) may be difficult or cumbersome to handle and/or precisely position because of the shape, configuration or small size of the item. Precise positioning may also be difficult due to the small or awkward area or nature of the item where the item is to be placed. When more than one item is required to be positioned, the small or differing sizes, shapes and or configurations of the items may be a hindrance to precisely locating and affixing the items. Likewise, if the items are to be positioned proximate to one another, the close desired positioning of the items may make handling and precise positioning difficult. If the precise positioning requires measuring distances or dimensions, making the correct measurements and/or effectively using such measurements may be difficult. For another example, it may be unduly time-consuming to properly precisely position the item(s) on the carrier. In instances where time is in short supply, such as in military-type settings, the importance and burden of correctly placing items on carriers, such as ribbons on uniform shirts, in a short time, could be a source of stress, and the accuracy and correctness of placement may be sacrificed.

In many instances, the items must be removed and/or replaced on repetitive basis, such as to allow for cleaning or maintenance of the carriers, requiring repeated occurrences of precise positioning. Thus, any of the above or other problems associated with precise positioning may be recurring frequently.

It should be understood that the above-described examples, features and/or disadvantages are provided for illustrative purposes only and are not intended to limit the scope or subject matter of the claims of this patent application or any patent or patent application claiming priority hereto. Thus, none of the appended claims or claims of any related application or patent should be limited by the above discussion or construed to address, include or exclude the cited examples, features and/or disadvantages, except and only to the extent as may be expressly stated in a particular claim.

Accordingly, there exists a need for apparatus and methods useful to assist in the accurate positioning of items on carriers.

BRIEF SUMMARY

In some embodiments, the present invention involves an apparatus useful for properly positioning at least one badge on the front of a garment at least partially over a pocket of the garment and at least one ribbon assembly above the pocket. The apparatus includes a template removably posidonable on the front of the gannent at least partially above the pocket. The template includes at least one horizontal alignment indicator useful for centering the template relative to the pocket A bottom edge of the template is alignable along a top edge of the pocket to allow proper positioning of the at least one badge and at least one ribbon assembly on the garment. A top edge of the template is useful for proper positioning of at least one ribbon assembly on the garment at a location above thd pocket. When the bottom edge of the ribbon assembly is aligned along the top edge of the template and the ribbon assembly is centered above the template, the ribbon assembly is properly positionable on the garment.

The template of these embodiments includes first and second cut-outs extending from a top edge of the template. First and second engagers of the first badge are concurrently moveable and positionable within the first and second cut-outs, respectively, and may be engaged with the garment therethrough. After the ribbon assembly and badge are properly positioned on the garment, the template is removable without disturbing such positions.

In many embodiments, the present invention involves a removable template usetbl for detenning correct placement of at Inst one item having first and tecond rear- theing pins at a desired location on the front of a carrier. The template is elongated and has no moving parts. The template includes first and second pairs of opposing measurement reference points proximate to its left and right sides and which are useful for assisting in horizontally positioning the template on the front of the carrier.Alirst outline is formed in or on the template in the shape of at least part of a firsL item, wherein the first item may be positioned relative to the first outline for proper alignment of the first item over the template. First and second cut-outs each extend from a top edge of the template, wherein the first and second rear-facing pins of the first item are concurrently moveable within the first and second cut-outs, respectively. Each of the first and second cut-outs terminates at a respective lip. Each lip represents the desired location of a rear-facing pin of the first item for proper positioning of the first item on the carrier. The rear-facing pins of the first item may be engaged with the carrier through the first and second cut-outs while the first item is disposed over the template. respectively .After the item is properly positioned upon and engaged with the carrier, the template may be removed without disturbing the position of the at least one item.

There are embodiments of the present invention that involve a method for properly positioning at least a first item on the front of a garment at least partially over a pocket of the garment and at least a second item above the pocket, if it is desired to so position at least a second item. The method utilizes an elongated template that includes a first outline in the shape of at least part o:f the first item. The method includes aligning a bottom edge of the template along a top edge of the pocket. Corresponding horizontal alignment reference points on the left and right sides of the front of the template are aligned with the left and right upper corners of the pocket, respectively. The first item is placed at least partially onto the template in alignment with the first outline of the template. The first and second rearflicing engagers of the first item are placed through first and second cut-outs formed in the template. respectively, and engaged with the garment. If it is desired to position at least a second item on the garment above the pocket, a bononi edge of the at least second item is aligned along a top edge of the template. The second item is centered above the template and engaged with the garment The template may be moved down and away from the first item without disturbing the position of the at least one item.

Accordingly, the present disclosure includes features and advantages which are believed to enable it to advance the art of placing items on carriers. Characteristics and advantages of the present disclosure described above and additional features and benefits will be readily apparent to those skilled in the art upon consideration of the following detailed description and referring to the accompanying drawings.

BRIEF DESCRIPTION OF THE DRAWINGS

The following figures are part of the present specification, included to demonstrate certain aspects of embodiments of the present disclosure and referenced in the detailed description herein.

DETAILED DESCRIPTION

Figure 1:
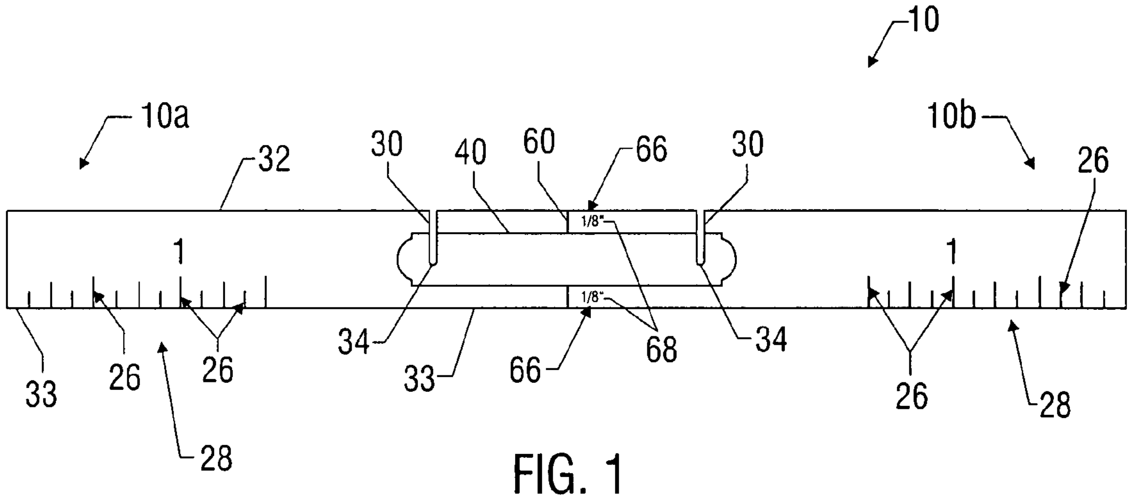
FIG. 1 is a front view showing an apparatus useful for assisting in correctly placing one or more items at a desired location on a carrier in accordance with an embodiment of the present disclosure.

Characteristics and advantages of the present disclosure and additional features and benefits will be readily apparent to those skilled in the art upon consideration of the following detailed description and referring to the accompanying figures. It should be understood that the description herein and appended drawings are of various exemplary embodiments and are not intended to limit the appended claims or the claims of any patent or patent application claiming priority to this application. On the contrary, the intention is to cover all modifications, equivalents and alternatives falling within the spirit and scope of the claims. Many changes may be made to the particular embodiments and details disclosed herein without departing from such spirit and scope.

In the description below and appended FIGURES, common or similar features' are indicated by like or identical reference numerals or, in the absence of a reference numeral, are evident based upon the appended FIGURES and/or description herein. The FIGURES are not necessarily to scale and certain features and certain views of the FIGURES may be shown exaggerated in scale or in schematic in the interest of clarity and conciseness. It should also be noted that reference herein and in the appended claims to components and aspects in a singular tense does not necessarily limit the present disclosure to only one such component or aspect, but should be interpreted generally to mean one or more, as may be suitable and desirable in each particular instance.

Referring initially to FIG. 1, an embodiment of a template 10 useful to assist in determining the correct placement of one or more items onto a carrier in accordance with the present disclosure is shown. The term "correct placement" and variations thereof as used herein means the desired placement of the item on the carrier, such as in accordance with pertinent rules and/or regulations. If desired, the template 10 may be constructed for ease of use, ease of storage, longevity or a combination thereof. For example, the template 10 of FIG. 1 is thin and rectangular in outer-shape and constructed of a rigid and durable material, such as plastic. The particular embodiment shown has dimensions of approximately 6½" long by approximately ⅝" wide to assist in the placement of a USMC marksmanship badge and, if desired, one or more ribbon assemblies over the breast pocket of a USMC garment, such as a uniform shirt. However, the template 10 may have any desired shape, dimensions, construction and configuration. Further, a template in accordance with the present disclosure is not limited to the placement of USMC marksmanship badges and ribbons, but can be used for placing any item 14 on any carrier 12.

Still referring to FIG. 1, the template 10 of this embodiment may include at least one measurement reference point 26, such as to assist in positioning the template 10 over, upon or relative to the carrier 10. If included, the measurement reference point 26 may have any desired form and configuration. For example, the measurement reference point 26 may include any combination of lines, numbers, indentations, protrusions or other marking(s) and, if desired, may be color-coded or otherwise designed to facilitate easy use. In this embodiment, a set 28 of ruler-like reference points 26 is formed in or printed onto the front of the template 10 proximate to each side 10*a*, 10*b* of the template 10 and is useful in centering the template 10 at the desired location over the item 14, such as relative to the breast pocket 22 (see e.g. FIG. 3) of the USMC shirt 24.

Still referring to FIG. 1, the template 10 may include at least one positioner to assist in positioning the item on the carrier. The positioner may have any suitable form and configuration. For example, the positioner may be a cut-out 30 extending downwardly from the top edge 32, upwardly from the bottom edge 33 or from a side edge of the template 10 to a lip 34. Each positioner may be selectively located on the template 10 to assist in allowing correct placement of the item 14 onto the carrier 12. In this embodiment, a pair of aligned slit-like cut-outs 30 with corresponding lips 34 is provided. Each cut-out 30 of this example is capable of allowing the passage therethrough of an engager 36 of an item 14. The engager 36 may have any suitable form, shape and configuration. In this example, the engager 36 is a rear rear-facing spike (see e.g. FIG. 4) of a USMC marksmanship badge 16.

When included, the cut-out 30 may have any suitable form, dimensions and configuration. For example, the cut-out 30 may open at the top edge 32 (e.g. FIG. 1), bottom edge 33 or a side edge of the template 10, or a combination thereof, to allow ease of removal of the template 10 or any other desired purpose. For another example, the cut out 30 may have multiple lips 34 or other features to provide multiple placement positions for the corresponding item 12. If desired, the width of the cut-out 30 may vary along its length. For example, the cut-out 30 may have an overall V-shape (not shown). For another example, the cut-out 30 may have a curved shape (not shown). For yet another example, the cut-out 30 may include a circular or other-shaped bulb-like portion (not shown) at the location of the lip 34.

Figure 2:
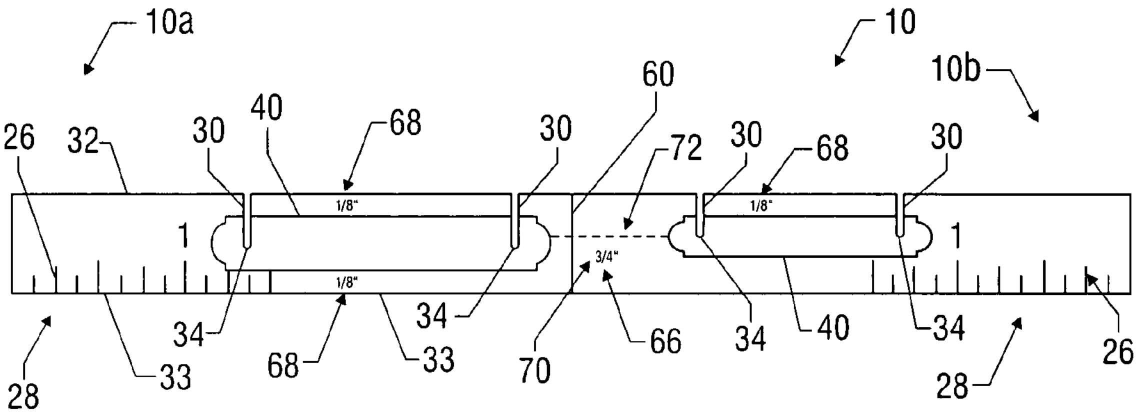
FIG. 2 is a front view showing an apparatus useful for assisting in correctly placing one or more items at a desired location on a carrier in accordance with another embodiment of the present disclosure.

In some embodiments, the template 10 may include multiple sets of cut-outs 30 to assist in the correct placement of more than one item 14 on a carrier 12. In the embodiment of FIG. 2, for example, the template 10 is configured to assist in the correct placement of two USMC marksmanship badges 16 (see e.g. FIG. 3), such as a USMC rifle marksmanship badge 54 and a USMC pistol marksmanship badge 56, onto a carrier 12. In this example, the pair of cut-outs 30 closest to the left side 10*a* of the template 10 is useful for positioning the rifle badge 54 and the cut-outs 30 closest to the right side 10*b* of the template are useful for positioning the pistol badge 56. Thus, the present disclosure is not limited by the quantity, shape, configuration, arrangement or dimensions of the cut-out 30, when included.

Still referring to FIG. 1, if desired, at least one outline 40 of an item 14 may be formed in, or provided or printed onto, the template 10 to assist in correct placement of the item 14, or a portion thereof. The outline 40 may have any suitable shape, size, configuration and location. If desired, the outline 40 may be color-coded or otherwise designed for ease of use. In the embodiment of FIG. 1, the outline 40 matches the outer shape of the holding bar 48 of a USMC marksmanship badge 50 (see e.g. FIG. 3). The outline 40 of this example is located relative to the cut-outs 30 to assist in ensuring the correct placement of the badge 50 over the template 10 and the engagers 36 in the cut-outs 30. In other embodiments, multiple outlines 40 to match different shaped items or parts thereof, such as different shaped badge holding bars 44 (see e.g. FIG. 3), may be associated with the same cut-out 30 or pair of cut-outs 30, or different cut-outs 30 on the template 10.

In the example of FIG. 2, the template 10 includes outlines 40 associated with each pair of cut-outs 30. The outline 40 associated with the left set of cut-outs 30 matches the current outer shape of the holding bar 48 of a USMC rifle marksmanship badge 54 (see e.g. FIG. 3), while the outline 40 associated with the cut-outs 30 nearest to the right side 10*b* of the template 10 matches the current outer shape of a holding bar 49 of a USMC pistol marksmanship badge 56. Thus, the present disclosure is not limited by the quantity, shape, configuration, arrangement or dimensions of the outline, when included.

Still referring to FIG. 1, if desired, the template 10 may be useful for the correct placement of one or more item 14 on the carrier 12 at a desired location proximate to (e.g. above, below or adjacent to) the template 10 when the template is (temporarily) positioned on the carrier 12. For example, the template 10 may have one or more vertical positioning guides for correct vertical positioning of the item 14 proximate to the template 10. In the embodiment of FIG. 1, the top edge 32 and width of the template 10 may serve as vertical positioning guides for correctly vertically positioning one or more items 14 directly above the location of the template 10. For another example, the template 10 may be provided with one or more horizontal positioning guides for correct horizontal positioning of the item proximate to the template 10. For example, the measurement reference points 26 may serve as a horizontal positioning guide for item(s) 14 to be positioned above or below the location of the template 10. For another example, the template 10 may instead or also include an intermediate reference 60 provided on or in the template 10 to indicate a different location for positioning an item 12 proximate to the template 10. In the embodiment of FIG. 1, the intermediate reference 60 is at the mid-point of the length of the template 10 for centering an item 14 above the template 10.

In the example of FIG. 2, the template 10 may be used for positioning one or more ribbon assemblies 18 on the USMC shirt 24 above the breast pocket 22. As used herein, the term "ribbon assembly" includes one or more military or other similar ribbon and/or corresponding backing member. In this example, the top edge 32 and width of the template 10 serve as vertical positioning guides to provide the proper spacing for placement of the ribbon assembly 18. When the template 10 is properly positioned on the shirt 24 relative to the pocket 22, the placement of the ribbon assembly 18 above and abutting the top edge 32 of the template 10 provides the correct vertical placement of the ribbon assembly 18 on the shirt 24. The intermediate reference 60, provided at the mid-point of the length of the template 10, serves as a horizontal positioning guide to center the ribbon assembly 18 over the template 10 and properly horizontally position the ribbon assembly 18 on the shirt 24. Thus, the present disclosure is not limited by quantity, shape, configuration, arrangement or dimensions of the vertical and/or horizontal positioning guides, when included.

Referring still to FIG. 2, if desired, the template 10 may include one or more indicator 66 to indicate a particular spacing or distance value or other dimension. The indicator(s) 66 may have any suitable form and configuration. In this embodiment, for example, upper and lower vertical badge spacing indicators 68 are provided on the template 10. These values represent the correct distance between a properly positioned USMC marksmanship badge 16 and adjacent components, or items, that may be located above and/or below the badge 16, respectively. In this particular configuration, the vertical badge spacing indicators 68 each provide a value of ⅛", which represents the distance between the holding bar 44 of a correctly positioned USMC marksmanship badge 16 and (i) any ribbon assemblies 18 (e.g. FIG. 3) that may be correctly positioned above the badge 16, and (ii) the top of the pocket 22, respectively. This particular embodiment also includes a horizontal badge spacing indicator 70, which represents the correct spacing between correctly placed adjacent badge holding bars 44 (e.g. FIG. 3), and a spacer line 72, which illustrates the space represented by the indicator 70. However, the present disclosure is not limited by quantity, shape, configuration, arrangement or dimensions of the indictors, when included.

An embodiment of a method of correctly placing at least one item on a carrier in accordance with the present disclosure will now be described with reference to FIG. 1. It should be understood, however, that the methods of neither the present disclosure nor the appended claims are limited to use with the illustrated template 10 of FIG. 1. In this embodiment, the template 10 is properly positioned at the desired location on the carrier using the measurement reference point(s) 26. For example, if the carrier is a USMC garment, such as a uniform shirt and the item is a USMC rifle marksmanship badge, the exemplary template 10 may be placed flat and face up on the shirt above the breast pocket so that its bottom edge 33 abuts the top edge of the pocket. The corresponding reference points 26 on the left and right sides 10*a*, 10*b* of the template 10 are aligned with the left and right edges of the pocket, respectively.

After the template 10 is properly positioned relative to the carrier, the item is engaged over the template 10 at the appropriate location to ensure correct vertical and horizontal placement of the item. For example, the holding bar of a two-spike USMC rifle marksmanship badge may be positioned face up over the outline 40 of the template 10. The left and right spikes extending from the rear of the holding bar may be seated against the lips 34 of the left and right cut-outs 30 of the template 10, respectively. The spikes may thereafter be pressed through the carrier, correctly placing the badge on the carrier. If desired, the badge may be secured to the carrier, such as with the use of spike covers. However, the present disclosure may be used for correctly placing items that do not include spikes.

If the template 10 is also useful for assisting in correctly placing of one or more item on the carrier proximate to the template 10 when the template is (temporarily) positioned on the carrier, such item(s) may be correctly positioned on the carrier. For example, if the template 10 includes one or more vertical positioning guide for correct vertical positioning of the item above the template 10 on the carrier, the vertical positioning guide is used to vertically position the item on the carrier. If the template 10 includes one or more horizontal positioning guide for correct horizontal positioning of one or more item above or below the template 10 on the carrier, the horizontal positioning guide is used to horizontally position the item on the carrier. For example, one or more ribbon assemblies may be correctly placed onto the USMC uniform shirt by centering the ribbon assembly on the intermediate reference 60 of the template and abutting the lower edge of the lowermost ribbon assembly with the top edge 32 of the template 10. The ribbon assemblies may thereafter be secured to the carrier, as desired.

If desired, the template 10 may be removed without disturbing the position of the badge and, if included, the ribbon assembly. In this example, the template 10 may be slid downwardly away from the badge and carrier, disengaging the cut-outs 30 from the spikes and removing the template 10.

An embodiment of a method of correctly placing at least one item on a carrier in accordance with the present disclosure will now be described with reference to FIGS. 2-4. It should be understood, however, that the methods of neither the present disclosure nor the appended claims are limited to use with the illustrated template 10 of FIGS. 2-4. In accordance with this embodiment, referring to FIG. 3, the subject carrier 12, such as a service uniform shirt 24, may, if desired, be placed on an at least partially flat surface with the desired placement area, such as the breast pocket 22 area, facing up. The template 10 is placed flat and face up on the shirt 24 above the pocket 22 so that its bottom edge 33 is flush with the top edge 23 of the pocket 22. The measurement reference point(s) 26 are used to center the template 10 over the pocket 22.

Figure 4:
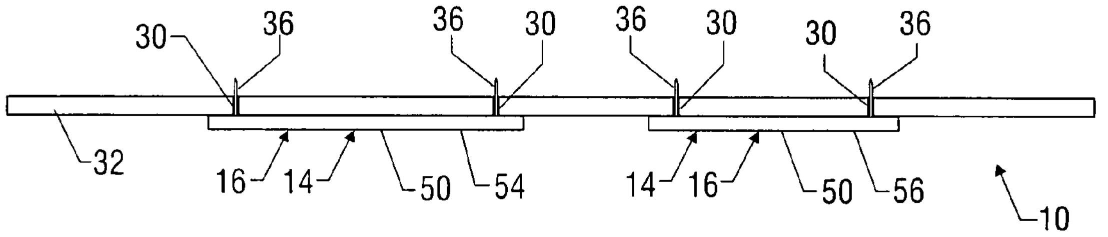
FIG. 4 is an isolated top view of the apparatus shown in FIG. 3 engaged with the USMC rifle and pistol marksmanship badges.

If the template 10 is used to correctly place a USMC rifle marksmanship badge 54 and a USMC pistol marksmanship badge 56 on the shirt 24, the respective engagers 36, such as the spikes extending from the back of the holding bars 44 of the subject badges 54, 56, are positioned at the respective lips 34 of the corresponding cut-outs 30 of the template 10, such as shown in FIG. 4. If one or more outline 40 (FIG. 2) is included on the template 10, the badge holding bars 44 are aligned over the corresponding outlines 40 to ensure proper positioning of the engagers 36. Pressure may be applied to the badges 54, 56, if necessary, to drive the engagers 36 into or through the shirt 24.

Figure 3:
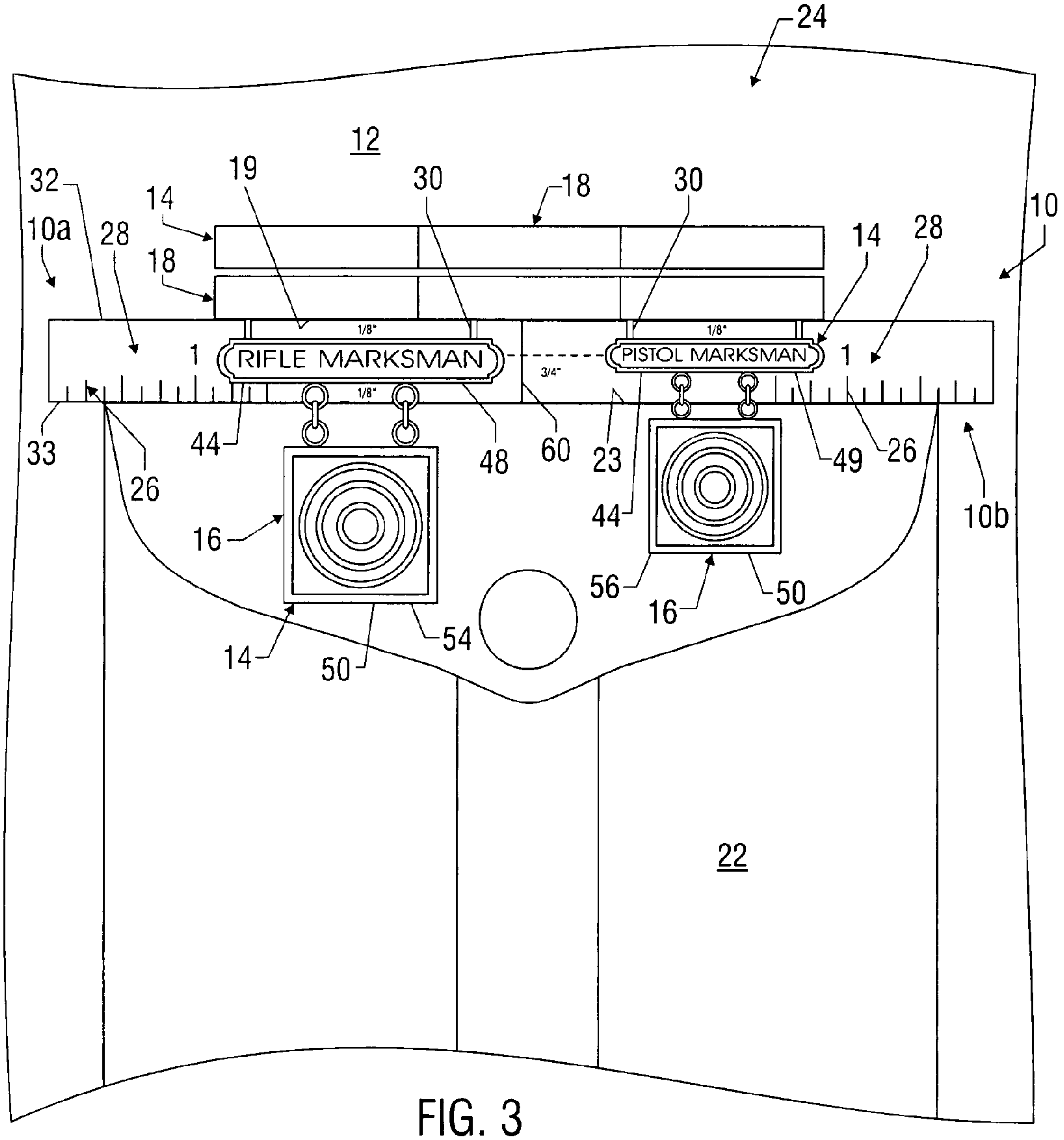
FIG. 3 is a front view of the apparatus of FIG. 2 shown used in the placement of USMC rifle and pistol marksmanship badges and service ribbons on a USMC uniform shirt in accordance with an embodiment of the present disclosure.

Still referring to FIG. 3, if one or more ribbon assemblies 18 are to be positioned, the ribbon assembly 18 is centered over the center reference 60 of the template 10 for correct horizontal alignment. The bottom edge 19 of the ribbon assembly 18 (or lowermost row of multiple vertical ribbon assemblies 18) is aligned flush with and abutting the top edge 32 of the template 10. The ribbon assembly 18 may be engaged with the carrier 12, as is know.

Referring to FIG. 4, the illustrated template 10 may be removed by moving it downward, moving the cut-outs 30 away from the engagers 36 and disengaging the template 10. The badges 54, 56 may be secured to the carrier 12 as is known, such as with spike backings.

Examples of the present disclosure thus offer advantages over the prior art. However, each of the appended claims does not require each of the components and acts described above and is in no way limited to the above-described examples and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The methods described above and which may be claimed herein and any other methods which may fall within the scope of the appended claims can be performed in any desired suitable order and are not necessarily limited to the sequence described herein or as may be listed in any appended claims. Further, the methods of the present disclosure do not necessarily require use of the particular examples shown and described in the present specification, but are equally applicable with any other suitable structure, form and configuration of components.

While preferred embodiments have been shown and described, many variations, modifications and/or changes of the system, apparatus and methods herein, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of this disclosure and scope of the appended claims. Thus, all matter herein set forth or shown in the accompanying drawings should be interpreted as illustrative, and the scope of this disclosure and the appended claims should not be limited to the examples described and shown herein.

The invention claimed is:

1. An apparatus for positioning at least one badge at a predetermined position on the front of a garment relative to a pocket of the garment and at least one ribbon assembly at a predetermined position relative to the pocket, the at least one badge having at least two engagers extending therefrom for engagement with the garment, said apparatus comprising:

a. template having a top edge, a bottom edge. and at least one outline therebetween, the template being removably positionable on the front of the garment at least partially above the pocket, said template further including, ribbon assembly positioning guides positioned on the template to locate a predetermined position of a ribbon assembly on the garment in spaced relation with the pocket and with the template, badge positioning guides positioned on the template to locate a predetermined position of at least a portion of a badge beneath the template, and template position indicators for positioning the template at a predetermined template position relative to the pocket, the template being configured such that when the position indicators are aligned with the pocket to place the template in the predetermined template position. the positioning guides are simultaneously positioned to fix predetermined positions of the badge and ribbon assembly relative to the pocket and the template, the template position indicators including horizontal alignment indicators positioned on the template to center said template relative to the pocket and the bottom edge of said template, the bottom edge being alignable along a top edge of the pocket; and, wherein said ribbon assembly positioning guides include the top edge of said template and a center positioning reference mark on the template, the template being configured such that, at the predetermined position of the template relative to the pocket, the ribbon assembly positioning guides fix the predetermined position of the ribbon assembly relative to the pocket, the predetermined position of the ribbon assembly being spaced from the pocket, and wherein the badge positioning guides include first and second cut-outs extending from at least one said top edge of said template and terminating between said top edge and a least one said bottom edge, wherein first and second engagers of a first badge arc concurrently moveable and positionable within said first and second cut-outs, respectively, and may be engaged with the garment therethrough and wherein said first and second cut-outs extend into said outline, the template being further configured such that after the at least one ribbon assembly and at least one badge are positioned on the garment, said template is removable without disturbing the position of the at least one ribbon assembly and at least one badge.

2. The apparatus of claim 1 wherein said first and second cut-outs are substantially vertical, straight and parallel and have substantially the same length.

3. The apparatus of claim 2 wherein each of said first and second cut-outs terminates at a respective lip, each said lip representing a predetermined location of one of the engagers of the first badge for positioning of the first badge on the garment.

4. The apparatus of claim 1 wherein said template comprises a single member without moving parts.

5. The apparatus of claim 4 wherein said template is elongated and includes left and right sides, further wherein said horizontal alignment indicators include first and second sets of correspondingly spaced references disposed proximate to said left and right respective sides of said template.

6. The apparatus of claim 1 wherein said at least one outline includes a first outline formed in the shape of at least a portion of a first badge and provided on the front of said template, the template being further configured such that when the template is positioned at the predetermined template position said first outline indicates a predetermined position of said portion of the first badge.

7. The apparatus of claim 6 wherein the first badge is a marksmanship badge having a holding bar and said first outline is formed in the shape of at least pan of the holding bar thereof

8. The apparatus of claim 6 further including a second outline formed in the shape of part least pan of a second badge and provided on the front of said template, wherein when the corresponding second badge portion is positioned relative to said second outline, the second badge is properly positionable relative to the garment, and third and fourth cut-outs extending from at least one said top edge of said template and terminating within said second outline, wherein first and second engagers of the second badge are concurrently moveable and positionable within said third and fourth cut-outs, respectively, and may be engaged with the garment therethrough.

9. The apparatus of claim 8 wherein the Lust badge is a rifle marksmanship badge having a holding bar and said first outline is formed in the shape of at least part of the holding bar thereof and the second badge is a pistol marksmanship badge having a holding bar and said second outline is formed in the shape of at least part of the holding bar thereof.

10. The apparatus of claim 8 further including at least one back support positionable underneath the garment and engageable with the at least one badge and at least one ribbon assembly.

11. A removable template for determining a correct placement of at least one badge having first and second rear-facing pins at a location on the front of a carrier and a ribbon assembly on the front of the carrier, the template comprising:

an elongated template body without moving parts, including a front face, top edge, a bottom edge and left and right sides;

first and second pairs of opposing measurement reference points proximate to the left and right sides of the template, respectively, for positioning the template horizontally on the front of the carrier at a predetermined template position;

a first outline formed in the shape of at least part of a first badge and provided on said front face, the template being configured such that, when the template is placed in the predetermined template position, said first outline indicates a predetermined position of the first badge on the carrier; and first and second cut-outs each extending from said top edge, wherein the first and second rear-facing pins of the first badge are concurrently moveable within said first and second cut-outs, respectively, and wherein said first and second cut-outs extend into said first outline, each of said first and second cut-outs terminating at a respective lip, each said lip representing the desired location of a rear-facing pin of the first badge for proper positioning of the first badge on the carrier when the template is properly positioned relative to the carrier, wherein the rear-facing pins of the first badge may be engaged with the carrier through said first and second cut-out while the first badge is disposed over the template, the template being further configured such that, after the first badge is positioned in the predetermined position upon and engaged with the carrier, the template may be removed without disturbing the position of the at least one badge; and ribbon assembly positioning guides positioned on the template to locate a predetermined position of the ribbon assembly on the garment in spaced relation with the template, the template being configured such that when the template is placed in the predetermined template position, the ribbon assembly positioning guides are positioned to fix the position of the ribbon assembly on the garment in spaced relation with the template body.

12. The template of claim 11 wherein the first badge is a marksmanship badge having a holding bar and said first outline is formed in the shape of at least part of the holding bar thereof.

13. The template of claim 12 further including a second outline formed in the shape of at least part of a second badge and provided on said front face, wherein the second badge may be positioned relative to said second outline for proper alignment ofthe second badge over the template, and third and fourth cut-outs each extending from said top edge, wherein first and second rear-facing pins of the second badge are concurrently moveable within said third and fourth cut-outs, respectively, and each of said third and fourth cut-outs terminating at a respective lip, each said lip representing the desired location of a rear-facing pin of the third item for proper positioning of the second badge on the carrier when the template is properly positioned relative to the carrier, wherein the rear-facing pins of the second badge may be engaged with the carrier through the third and fourth cut-outs while the second badge is disposed Over the template.

14. The apparatus of claim 13 wherein the first badge is a U.S. Marine Corps rifle marksmanship badge and said first outline is formed in the shape of the holding bar thereof and the second badge is a U.S. Marine Corps pistol marksmanship badge and said second outline is formed in the shape of the holding bar thereof.

15. A method of positioning a badge having at least first and second rear-facing engagers on a front of a garment at a predetermined position of the badge relative to the pocket at least partially over a pocket of the garment and a ribbon assembly at a predetermined position of the ribbon assembly relative to the pocket above the pocket, said method comprising the steps of:

providing a template having a top edge. a bottom edge. and first and second cutouts therebetween, said template further including ribbon assembly positioning guides positioned on the template to locate a position of a ribbon assembly on the garment in spaced relation with the pocket and with the template, badge positioning guides positioned on the template to locate a position of a portion of a badge beneath the template, and template position indicators for positioning the template at a predetermined position relative to the pocket. the template position indicators including horizontal alignment indicators positioned on the template to center said template relative to the pocket and the bottom edge of said template: and wherein the ribbon assembly positioning guides include the top edge of said template and a center positioning reference mark on the template, and wherein the badge positioning guides include the first and second cut-outs extending from the top edge of the template and terminating between the top edge and the bottom edge and a first outline formed in the shape of at least a portion of a first badge using the template position indicators. aligning the template with a top edge of the pocket thereby centering the template, to place the template in the predetermined position of the template. whereby both the ribbon assembly positioning guides and the badge positioning guides are simultaneously positioned to fix the respective predetermined positions of the badge and the ribbon assembly relative to the product and the template:

with the template in the template predetermined position positioning the ribbon assembly at the predetermined ribbon assembly position by aligning the ribbon assembly with the top edge of the template. thereby centering the ribbon assembly about the center position mark, whereby the ribbon assembly is positioned above the pocket and the template;

with the template in the template predetermined position, positioning the badge at the predetermined badge position by placing the badge at least partially onto the template in alignment with the first outline of the template;

placing the first and second rear-facing engagers of the badge through first and second out-outs formed in the template, respectively;

engaging the first and second rear-facing engagers of the badge with the garment; and moving the template down and away from the badge without disturbing the position of the badge.

16. The method of claim 15, wherein the garment includes a pocket having a raised top edge and the predetermined position of the ribbon assembly is above the pocket, the step of aligning the template including aligning a bottom edge of the template onto and along the raised top edge of the pocket, and aligning corresponding horizontal alignment reference points on the left and right sides of the front of the template with the left and right upper corners of the pocket, respectively.

17. The method of claim 16, wherein the step of positioning the ribbon assembly includes aligning a bottom edge of the ribbon assembly along a top edge of the template, and engaging the ribbon assembly with the garment above the pocket.

* * * * *